US008628052B2

(12) United States Patent
Lee et al.

(10) Patent No.: US 8,628,052 B2
(45) Date of Patent: Jan. 14, 2014

(54) DISPLAY APPARATUS HAVING A SWIVELING STRUCTURE

(75) Inventors: Kyung-kyun Lee, Seoul (KR);
Young-bok Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1454 days.

(21) Appl. No.: 11/531,485

(22) Filed: Sep. 13, 2006

(65) Prior Publication Data

US 2007/0215762 A1    Sep. 20, 2007

(30) Foreign Application Priority Data

Sep. 13, 2005   (KR) .................. 10-2005-0084976

(51) Int. Cl.
*A47F 5/00*    (2006.01)

(52) U.S. Cl.
USPC ............. 248/289.11; 248/186.1; 248/919; 248/278.1; 248/122.1; 248/176.3; 361/679.02; 403/98; 403/111

(58) Field of Classification Search
USPC ............. 248/186.1, 186.2, 183.1, 131, 282.1, 248/125.7, 133, 278.1, 178.1, 183.2, 248/289.11, 919, 676, 122.1, 176.3, 349.1; 361/679.02, 679.06; 403/98, 111, 78, 403/164, 165, 74; 1/186.1, 186.2, 183.1, 1/131, 282.1, 125.7, 133, 278.1, 178.1, 1/183.2, 289.11, 919, 676, 122.1, 176.3
See application file for complete search history.

(56) References Cited

U.S. PATENT DOCUMENTS

| 3,936,026 | A | * | 2/1976 | Hampel et al. ............. 248/349.1 |
| 4,226,398 | A | * | 10/1980 | Freber .......................... 248/415 |
| 4,307,672 | A | * | 12/1981 | Shikimi ........................ 108/139 |
| 4,310,136 | A | * | 1/1982 | Mooney .................... 248/278.1 |
| 4,690,362 | A | | 9/1987 | Helgeland |
| 4,919,383 | A | * | 4/1990 | Benjamin et al. .......... 248/349.1 |
| 5,564,669 | A | | 10/1996 | Wu |
| 5,583,529 | A | | 12/1996 | Satou |
| 5,687,939 | A | | 11/1997 | Moscovitch |
| 6,163,452 | A | | 12/2000 | O'Neal |
| 6,334,599 | B1 | * | 1/2002 | Jeong ............................ 248/371 |
| 6,366,452 | B1 | | 4/2002 | Wang et al. |
| 6,373,689 | B1 | | 4/2002 | Yim |
| 6,446,913 | B1 | * | 9/2002 | Schroeder .................... 248/27.1 |

(Continued)

FOREIGN PATENT DOCUMENTS

| JP | 2-58822 | 4/1990 |
| JP | 03-113423 | 11/1991 |

(Continued)

OTHER PUBLICATIONS

European Search Report dated Jun. 6, 2007 issued in EP 06076719.

(Continued)

*Primary Examiner* — Kimberly Wood
(74) *Attorney, Agent, or Firm* — Stanzione & Kim, LLP

(57) ABSTRACT

The present invention relates to a display apparatus having a display body, comprising: a connecting member combined with the display body at an upper end part thereof and having a swivel part at a lower end part thereof; and a base having a swivel supporter where the swivel part is inserted and supporting the swivel part to be rotatable.

Thus, the present invention provides a display apparatus which is swiveled stably and smoothly with a slim structure.

25 Claims, 6 Drawing Sheets

(56) References Cited

U.S. PATENT DOCUMENTS

| | | | |
|---|---|---|---|
| 6,447,065 B1 * | 9/2002 | Ropp | 297/344.21 |
| 6,484,994 B2 * | 11/2002 | Hokugoh | 248/371 |
| 6,588,609 B1 * | 7/2003 | Richet et al. | 211/163 |
| 6,619,742 B1 * | 9/2003 | Bellefleur | 297/344.21 |
| 6,644,616 B1 | 11/2003 | Tsukuda | |
| 6,702,238 B1 | 3/2004 | Wang | |
| 6,702,604 B1 | 3/2004 | Moscovitch | |
| 6,712,326 B2 | 3/2004 | Kurimoto et al. | |
| 6,742,221 B2 * | 6/2004 | Lu et al. | 16/367 |
| 6,801,426 B2 * | 10/2004 | Ichimura | 361/679.06 |
| 6,837,469 B2 * | 1/2005 | Wu et al. | 248/278.1 |
| 6,883,206 B2 * | 4/2005 | Yang et al. | 16/337 |
| 6,918,564 B2 | 7/2005 | Yen et al. | |
| 6,921,057 B2 | 7/2005 | Chen et al. | |
| 6,967,668 B2 | 11/2005 | Byoun et al. | |
| 7,180,731 B2 | 2/2007 | Titzler et al. | |
| 7,195,214 B2 * | 3/2007 | Lee et al. | 248/125.8 |
| 7,226,028 B2 * | 6/2007 | Lin | 248/291.1 |
| 7,236,354 B2 | 6/2007 | Hsu et al. | |
| 7,267,312 B2 | 9/2007 | Kang et al. | |
| 7,268,999 B2 | 9/2007 | Kim | |
| 7,314,203 B2 * | 1/2008 | Yue | 248/349.1 |
| 7,440,038 B2 * | 10/2008 | Kato | 348/794 |
| 7,628,375 B2 * | 12/2009 | Jung et al. | 248/676 |
| 2003/0132360 A1 * | 7/2003 | Ju | 248/371 |
| 2003/0160138 A1 | 8/2003 | Rawlings et al. | |
| 2003/0184193 A1 | 10/2003 | Lee et al. | |
| 2003/0193773 A1 | 10/2003 | Choi | |
| 2004/0011932 A1 | 1/2004 | Duff | |
| 2004/0075971 A1 | 4/2004 | Tseng et al. | |
| 2004/0084579 A1 * | 5/2004 | Lee et al. | 248/125.1 |
| 2004/0178314 A1 * | 9/2004 | Chen et al. | 248/349.1 |
| 2004/0217244 A1 | 11/2004 | Wu et al. | |
| 2005/0279904 A1 * | 12/2005 | Lin | 248/324 |
| 2007/0221798 A1 * | 9/2007 | Lin | 248/176.1 |

FOREIGN PATENT DOCUMENTS

| | | |
|---|---|---|
| JP | 2001-282115 | 10/2001 |
| JP | 3106184 | 10/2004 |
| KR | 1999-37863 | 10/1999 |
| KR | 1999-0041572 | 12/1999 |
| KR | 1020000001380 | 1/2000 |
| KR | 2003-30721 | 4/2003 |
| KR | 2003-81761 | 10/2003 |
| KR | 1020040009338 | 1/2004 |

OTHER PUBLICATIONS

Chinese Office Action dated Mar. 13, 2009 issued in CN Application No. 200610151583.3.

Chinese Office Action Issued on Apr. 4, 2008 in CN Patent Application No. 2005101136048.

Chinese Office Action Issued on Jul. 31, 2009 in CN Patent Application No. 2005101136048.

Korean office Action Issued on Mar. 30, 2006 in KR Patent Application No. 10-2004-0085240.

U.S. Advisory Action Issued on Jun. 18, 2010 in U.S. Appl. No. 11/246,250.

U.S. Office Action Issued on Mar. 3, 2010 in U.S. Appl. No. 11/246,250.

U.S. Office Action Issued on Sep. 19. 2008 in U.S. Appl. No. 11/246,250.

U.S. Notice of Allowance Issued on Nov. 10, 2010 in U.S. Appl. No. 11/246,250.

U.S. Office Action Issued on Jul. 21, 2010 in U.S. Appl. No. 11/246,250.

U.S. Office Action Issued on Jun. 22, 2009 in U.S. Appl. No. 11/246,250.

U.S. Office Action Issued on Mar. 19, 2008 in U.S. Appl. No. 11/246,250.

U.S. Office Action Issued on Oct. 26, 2007 in U.S. Appl. No. 11/246,250.

U.S. Notice of Allowance Issued on May 8, 2012 in U.S. Appl. No. 13/033,800.

Chinese Rejection Decision Issued on Feb. 12, 2010 in CN Patent Application No. 2005101136048.

* cited by examiner

DISPLAY APPARATUS HAVING A SWIVELING STRUCTURE

CROSS-REFERENCE TO RELATED APPLICATIONS

This application claims the benefit of Korean Patent Application No. 2005-0084976, filed on Sep. 13, 2005, in the Korean Intellectual Property Office, which is hereby incorporated by reference for all purposes as if fully set forth herein.

BACKGROUND OF THE INVENTION

1. Field of the Invention

The present invention relates to a display apparatus, and more particularly, to a display apparatus having improved swiveling structure of a display body.

2. Description of the Related Art

A display apparatus is used for a TV, a computer, a cellular phone and etc. to provide images to a user. The display apparatus comprises a personal digital assistants (PDA), a portable computer and etc. which use a small-sized display body, and a liquid crystal display (LCD) TV, a plasma display panel (PDP) TV, a computer and etc. which use a large-size display body. Recently, the display apparatus having the large-sized display body has increased in demand.

The display apparatus having the large-sized display body is relatively heavy, and thus it needs to be supported stably. Thus, a large-sized TV or the like comprises a base member disposed on an installation surface to support the display body and a supporter combining the display body and the base member. The display apparatus may be provided as a fixed type or as a swiveling type. In the swiveling type display apparatus, the display body needs to be swiveled to change a viewing angle since the quality of an image and a sound and etc. may vary depending on the viewing angle. In addition, an external design as well as the price and the image quality is another factor that are becoming more important for users.

A device for swiveling an LCD monitor stand is disclosed in Korea Patent No. 10-431344. The device comprises a swivel part, a rotation disk and a coupling part. The swivel part has a cylindrical guide part and is interposed between a base and an installation surface. The swivel part has a flange internally protruded in a radial direction from an upper circumferential part of the guide part. The rotation disk has a larger diameter than the diameter of an opening hole formed by the flange. The rotation disk is rotatably accommodated in the swivel part, and has a smaller thickness than the height of the guide part. The fixing tool rotatably connects the rotation disk with the base.

With this configuration, the swivel part of the device contacts with the installation surface to support an LCD monitor and the LCD monitor can be swiveled by sliding between a circumference surface of the rotation disk and the guide part and the flange of the swivel part.

However, the swivel part has to have a wide area contacting with the bottom so as to support the LCD monitor stably, so that the conventional device needs a large-sized swivel part. Accordingly, the base should be large-sized to cover the swivel part and the base and the swivel part become thick, and thus it is difficult to make the base slim and a manufacturing cost of the swivel part may increase.

SUMMARY OF THE INVENTION

The present invention provides for a display apparatus which is swiveled stably and smoothly with a slim structure.

According to an embodiment of the invention, there is provided a display apparatus having a connecting member having a first end for connection to a display body, the connecting member capable of being rotated; a base comprising a first base member, the first member having a hole and a surface on one side for supporting a second end of the connecting member; a bracket disposed on the other side of the first base member and being connected to the second end of the connecting member through the hole of the first base member.

According to an embodiment of the invention, the display apparatus comprises a first friction member disposed between the bracket and the base to slide on at least one of the bracket and the base while the display body rotates.

According to an embodiment of the invention, the display apparatus further comprises a second friction member disposed between the connecting member and the base to slide on at least one of the connecting member and the base while the display body rotates.

According to an embodiment of the invention, the display apparatus further comprises a rotation control unit to control the display body to rotate within a predetermined angle.

According to an embodiment of the invention, the rotation control unit comprises a protrusion protruded from one of surfaces of the base and the bracket toward the other thereof; a protrusion guide groove formed in the other of the base and the bracket to engage with the protrusion; and a protrusion through groove formed in the first friction member through which the protrusion passes through.

According to an embodiment of the invention, the protrusion through groove is less than the protrusion guide groove in the range of a rotation control angle.

According to an embodiment of the invention, the first friction member and the second friction member comprise acetal resin.

According to an embodiment of the invention, the base comprises a lower base contacting with an installation surface and an upper base combined with the lower base and having an oval shape.

According to an embodiment of the invention, the upper base comprises an upper through hole where the connecting member is inserted and the swivel support is provided in the lower base to be separated from an installation surface.

Additional features of the invention will be set forth in the description which follows, and in part will be apparent from the description, or may be learned by practice of the invention.

BRIEF DESCRIPTION OF THE DRAWINGS

The accompanying drawings, which are included to provide a further understanding of the invention, illustrate embodiments of the invention and together with the description serve to explain the exemplary embodiments of the invention.

DETAILED DESCRIPTION OF THE PREFERRED EMBODIMENTS

Figure 1:
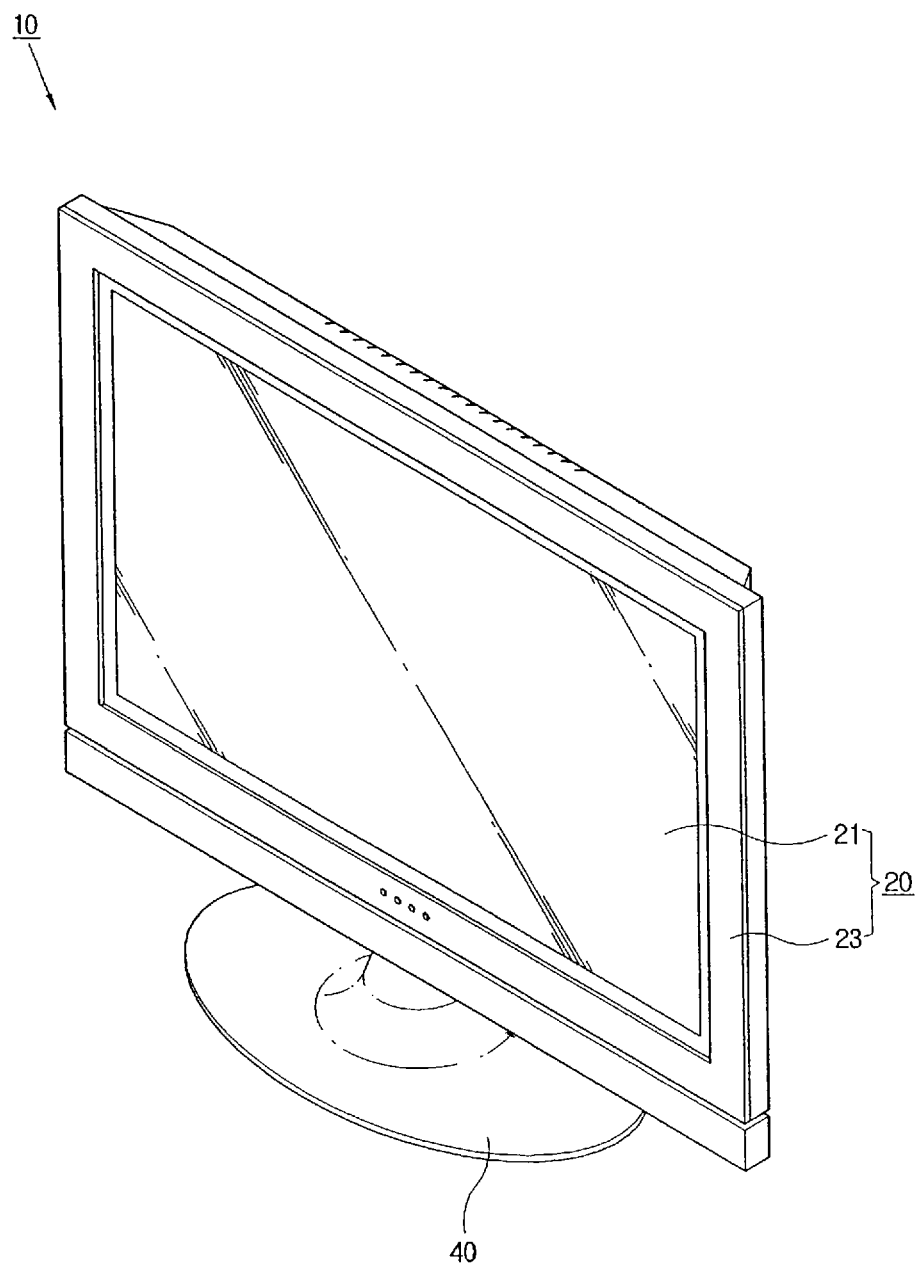
FIG. 1 is a perspective view of a general display apparatus.

Reference will now be made in detail to the embodiments of the present invention, examples of which are illustrated in the accompanying drawings, wherein like reference numerals refer to like elements throughout. The embodiments are described below so as to explain the present invention by referring to the figures.

Hereinafter, a display apparatus according to an exemplary embodiment of the present invention will be described as referring to drawings.

Figure 2:
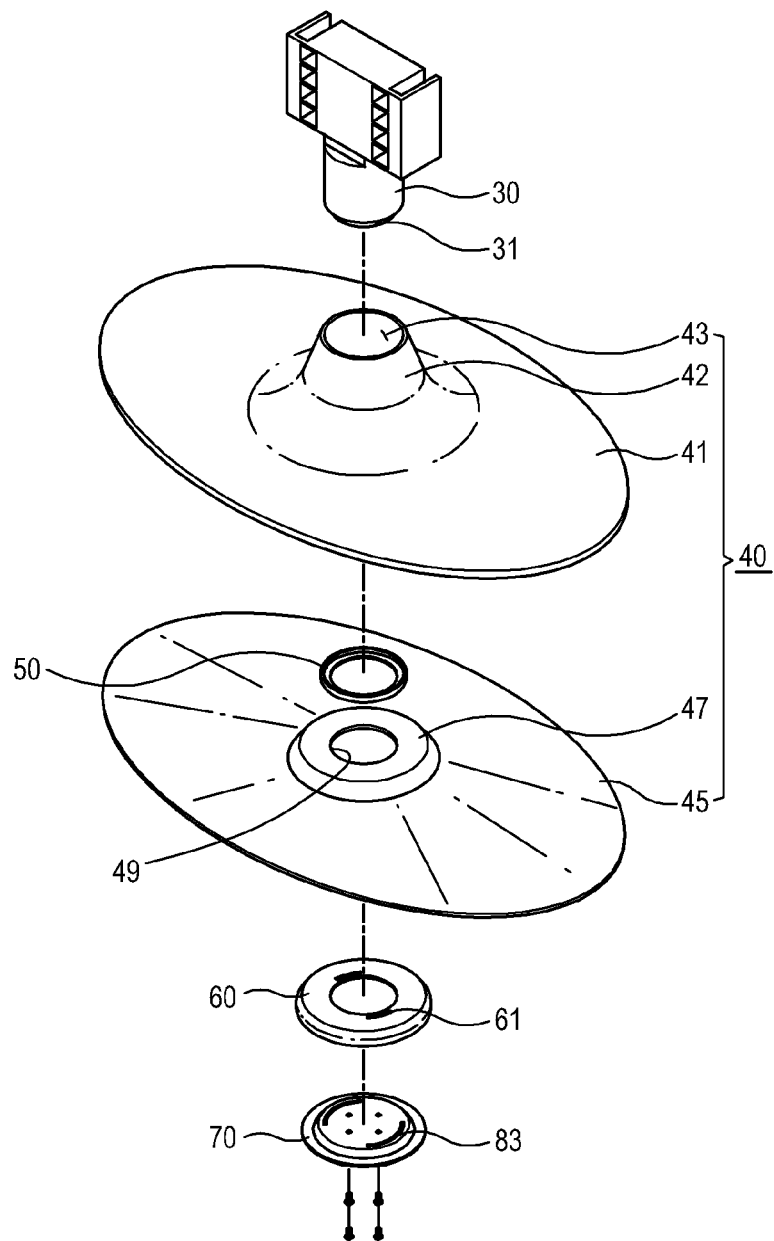
FIG. 2 is an exploded perspective view of a rotating part of a display apparatus according to the present invention.

As shown in FIGS. 1 and 2, a display apparatus 10 according to the present invention 10 comprises a display body 20, a connecting member 30 and a base 40. The connecting member 30 is combined with the display body 20 at an upper end part thereof and has a swivel part 31 at a lower end part thereof. The base 40 comprises a swivel supporter 47 supporting the swivel part 31 to be rotatable. The display apparatus 10 further comprises a bracket 70 combined with the base 40 to prevent the connecting member 30 from separating from the swivel supporter 47. The display apparatus 10 may comprise a first friction member 60 disposed between the bracket 70 and the lower base 45 to slide on the bracket 70 and the lower base 45 while the connecting member 30 rotates. Further, the display apparatus 10 may comprise a second friction member 50 having various thicknesses and disposed between the connecting member 30 and the lower base 45 to slide on the connecting member 30 and the lower base 45 while the connecting member 30 rotates. Also, the display apparatus 10 may comprise a rotation control unit 80 to control the connecting member 30 to rotate in a predetermined angle.

As shown in FIG. 1, the display body 20 comprises a display 21 and a casing 23 accommodating the display 21. The display body 20 is combined with the connecting member 30 and supported by the base 40.

The display 21 may be provided as a liquid crystal display (LCD), a plasma display panel (PDP), or etc.

As shown in FIG. 2, the connecting member 30 is combined with the display body 20 at the upper end part thereof and comprises the swivel part 31 at the lower end part thereof. The connecting member 30 is of a cylinder shape, but may be of other shapes such as an oval tube shape or a polygonal tube shape. The connecting member 30 may be made of a plastic material or etc.

Figure 3:
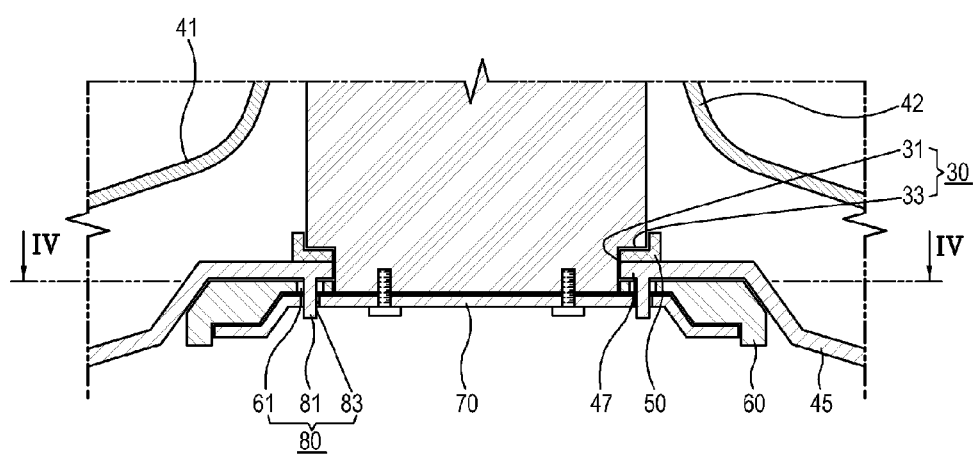
FIG. 3 is an enlarged sectional view of the rotating part.

As shown in FIGS. 2 and 3, the swivel part 31 is disposed at the lower end part of the connecting member 30 and rotatably supported by the swivel supporter 47 of the base 40. The swivel part 31 is combined with the bracket 70 through a screw or the like, thereby being prevented from separating from the swivel supporter 47. The swivel part 31 comprises a step part 33 contacting with a top surface of the swivel supporter 47 or the second friction member 50 to generate friction when rotating.

The base 40 comprises the swivel supporter 47 to support the swivel part 31 to be rotatable. The base 40 comprises the lower base 45 and an upper base 41. The lower base 45 contacts with an installation surface and is not seen from the outside and the upper base 41 is combined with the lower base 45 to be seen from the outside. The upper base 41 has an oval shape. The base 40 is combined with the stand 30 to support the display body 20.

As shown in FIG. 2, the upper base 41 is combined with the lower base 45 to make an oval appearance. The upper base 41 has a protrusion 42 having an upper through hole 43 where the lower end part of the connecting member 30 is inserted. The upper base 41 may be made of an attractive plastic plate or a metal plate to make its appearance look appealing.

As shown in FIGS. 2 and 3, the lower base 45 comprises the swivel supporter 47 to rotatably support the swivel part 31. The lower base 45 is not seen from the outside and contacts with the installation surface. The lower base 45 has a plate shape and protrudes or caves in so as to reinforce its strength. The center portion of the lower base 45 is protruded and is off the installation surface. The base 40 does not rotate while the display body 20 rotates. The lower base 45 may be combined with the upper base 41 through a screw, a hook or the like.

The lower base 45 may have a wide bottom to stably support the display body 20. The upper base 41 can be improved in its appearance regardless of the swiveling parts since the rotatable swivel part 31 is combined with the lower base 45 and covered with the upper base 41.

As shown in FIGS. 2 and 3, the swivel supporter 47 supports the swivel part 31 to be rotatable on the lower base 45. The swivel supporter 47 has a predetermined bent shape to support load of the display body 20.

The second friction member 50 is disposed between the connecting member 30 and the lower base 45 to slide on the connecting member 30 and the lower base 45 while the connecting member 30 rotates. The second friction member 50 has various thicknesses and contacting areas so as to control a friction force depending on the load of the display body 20.

The first friction member 60 is disposed between the bracket 70 and the lower base 45 to slide on the bracket 70 and the lower base 45 while the connecting member 30 rotates. The first friction member 60 has a shape corresponding to bent shapes of the bracket 70 and the lower base 45. The first friction member 60 comprises a protrusion through groove 61 through which a protrusion 81 (to be described later) passes through.

The first friction member 60 and the second friction member 50 are preferably made of acetal resin, which is excellent in wear resistance, has good strength and is excellent in friction related sound characteristics when the connecting member 30 rotates as compared with plastics or ABS resin.

The friction force may be controlled by adjusting the thicknesses and the contacting areas of the first friction member 60 and the second friction member 50 considering the size, the weight and the like of the display body 20. The swivel portion of the display body 20 is combined with the lower base 45, thereby making the base 40 slim. Also, one of the first friction member 60 and the second friction member 50 may be formed integrally with the lower base 45.

The bracket 70 is combined with the lower end part of the connecting member 30 through a coupling means under the base 40 to prevent the connecting member 30 from separating from the swivel supporter 47. The coupling means comprises a screw, a snap ring or a pin. The bracket 70 is combined with the swivel part 31 of the connecting member 30 when the base 40 is combined with the first friction member 60 and the second friction member 50, so that the friction force can uniformly be generated according to the rotation. The bracket 70 has a plate shape and is bent corresponding to the shape of the first friction member 60.

As shown in FIG. 3, the rotation control unit 80 comprises a protrusion 81, a protrusion guide groove 83 and the protrusion through groove 61. The protrusion 81 is protruded from the lower base 45 toward the bracket 70 and the protrusion guide groove 83 is formed in the bracket 70 to receive the protrusion 81. Further, the protrusion through groove 61 is formed in the first friction member 60 and the protrusion 81 passes therethrough. Accordingly, the connecting member 30 may be controlled to rotate in the range of a predetermined angle. The connecting member 30 rotates in the range of 0° to 90°, but may rotate within the range of 180° given the corresponding change in the length of the protrusion guide groove 83 and/or the protrusion through groove 61.

The protrusion 81 is protruded from the lower base 45 toward the bracket 70. The protrusion 81 is provided singularly or plurally and bent from the surface of the lower base 45

Figure 4A:
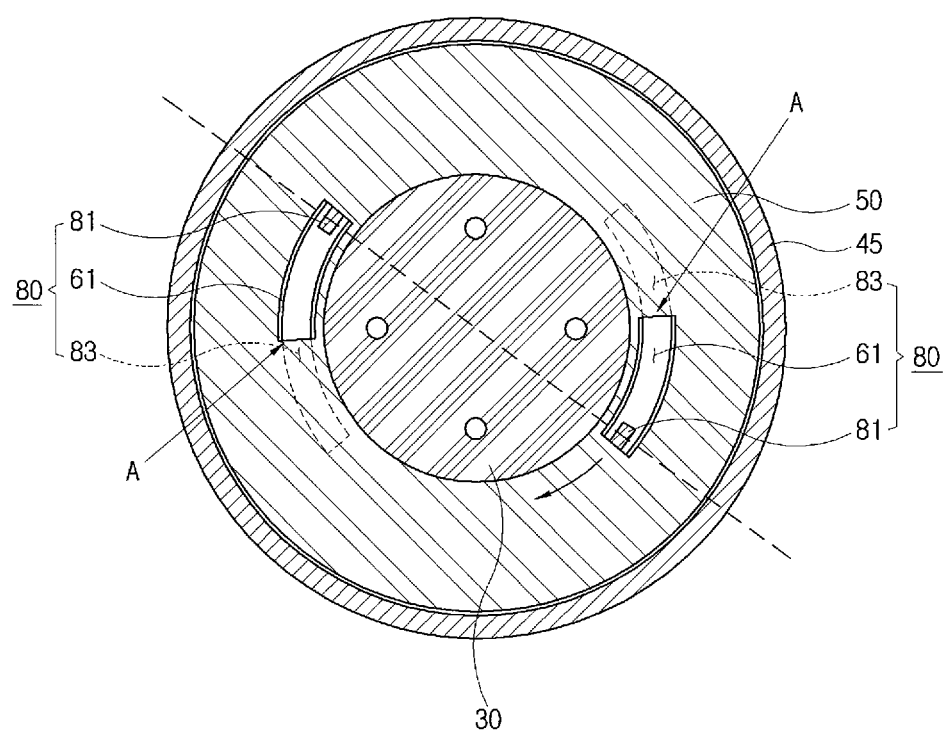
FIGS. 4A to 4C are schematic views to illustrate rotation of an angle control unit, taken along line □-□ in FIG. 3.
Figure 4B:
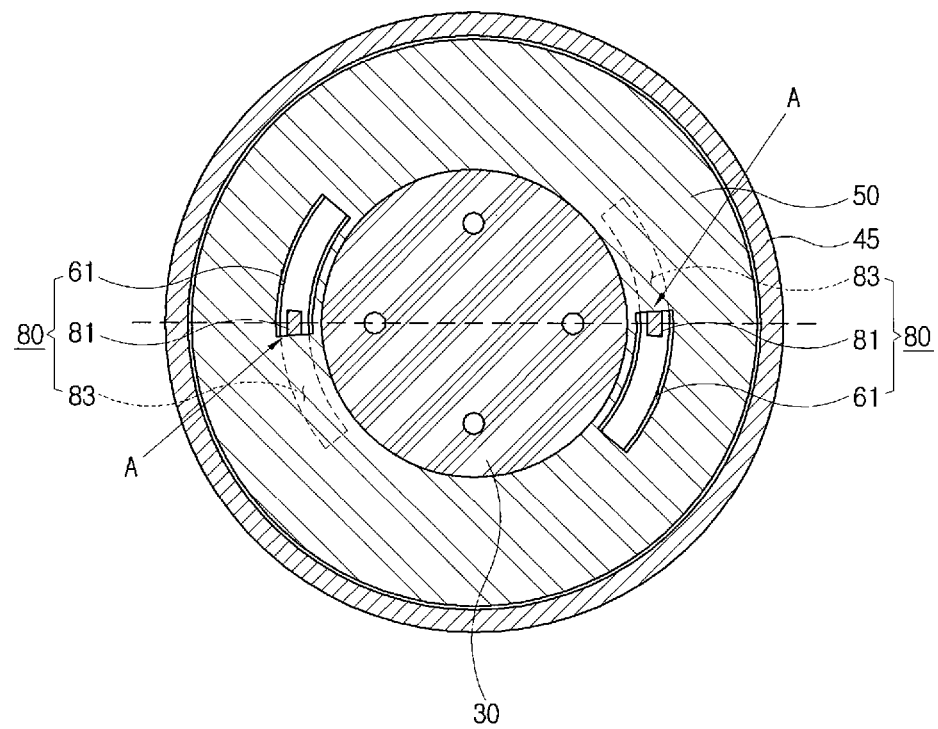
Figure 4C:
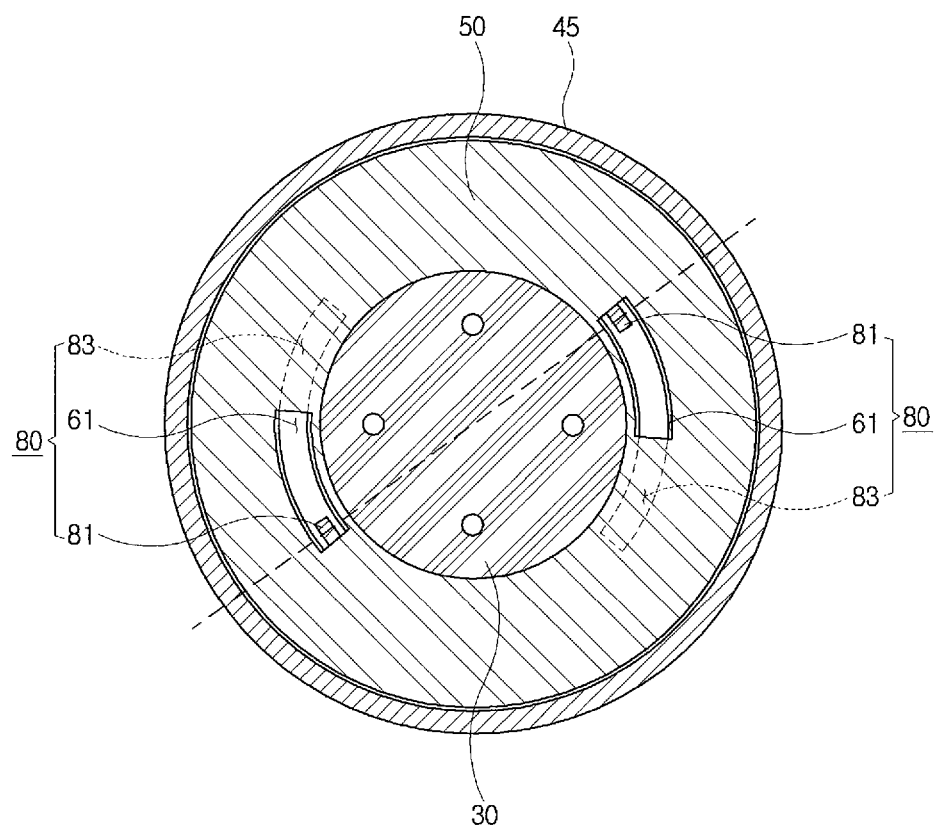

The protrusion guide groove 83 is formed in the bracket 70 to receive the protrusion 81. The protrusion guide groove 83 may be penetrated or caved-in. Alternately, the protrusion 81 may be formed in the bracket 70 and the protrusion guide groove 83 may be formed in the lower base 45. The protrusion guide groove 83 is a longer than the protrusion through groove 61 in a rotating direction. Accordingly, when the connecting member 30 is rotated in the clock-wise direction beginning from the state shown in FIG. 4A, the protrusion 81 does not contact the end portion A of the protrusion through groove 61 of the first friction member 60 until the state shown in FIG. 4B is reached. Upon further rotation, the protrusion 81 contacts the end portion A of the protrusion through groove 61 and thus, the first friction member is prevented from further rotation. The bracket 70 however further rotates until reaching the state as shown in FIG. 4C. Similar operation follows in the other rotating direction.

In order for the first friction member 60 to rotate in unison with the bracket 70 (for the case where the protrusion 81 does not contact either end portions of the protrusion through groove 61), the frictional force between the bracket 70 and the bottom surface of the first friction member 60 should be greater than the frictional force between the bottom surface of the lower base 45 and the top surface of the first friction member 60. Therefore, when the connecting portion 30 is rotated in the state in which the protrusion 81 contacts either end portions of the protrusion through groove 61, the frictional force applied against the rotating force will be greater than the case in which the protrusion 81 does not contact either of the end portions. There are various known ways to cause various different frictional forces to exist between the surfaces such as shape, size, material and treatment of the contacting surfaces.

Furthermore, the length of the protrusion through groove 61 in the rotating direction may be adjusted to control the friction force.

Hereto, the present embodiment has been described with a large-sized display apparatus as an example, but may be employed in a small-sized display apparatus.

The swiveling process of the display apparatus 10 according to the present invention will be described by referring to FIG. 4.

First, the combining process of the display apparatus is as follows. The lower base 45 is seated on the installation surface and the second friction member 50 is disposed thereon. Then, the lower base 45 is combined with the upper base 41 through a screw or the like. Next, the connecting member 30 is inserted through the upper through the hole 43 of the upper base 41 to contact the second friction member 50. The end portion of the connecting member 30 protruded toward the lower base 45 passes through the first friction member 60. Then, the bracket 70 is combined to the connecting member 30. Thereafter, the display apparatus body 20 is combined with the connecting member 30.

As described above, the first friction member 60 and the second friction member 50 may be combined with each other without an additional coupling means, and thus the configuration becomes simplified and assembling and disassembling processes become convenient. The disassembling process is performed in the reverse order of the combining process, and thus detailed description thereof will be omitted.

According to the present invention, when the display body is swiveled, a connecting member is combined with the lower base by using a bracket 70 in such a manner so as to allow the lower base 45 to remain stationary. Thus, the lower base 45 has a wide area to stably support the display body 20 and furthermore, the connecting member 30 and the bracket 70 can be made relatively small, thereby simplifying the configuration and reducing cost. Further, the upper base 41 may be designed substantially independent of the size or shape of the lower base and/or connecting member and the bracket, thereby allowing pursuing of attractive and slim appearance. Also, the first friction member or the second friction member slides, so that the display body may smoothly rotate.

As described above, the present invention provides a display apparatus which has a good appearance and rotates stably and smoothly.

It will be apparent to those skilled in the art that various modifications and variation can be made in the present invention without departing from the spirit or scope of the invention. Thus it is intended that the present invention cover the modifications and variations of this invention provided they come within the scope of the appended claims and their equivalents.

What is claimed is:

1. A display stand comprising:
   a connecting member having a first end for connection to a display body;
   a base with a protrusion on one side of the base, the protrusion having a hole capable of accepting a second end of the connecting member, the base having a swivel supporter to support the second end of the connecting member;
   a bracket disposed on the other side of the base and being connected to the second end of the connecting member through the hole, such that the connecting member can swivel about a vertical axis of the connecting member with respect to the base and both the second end of the connecting member and the protrusion collectively function as a neck between the base and the display body thereby supporting the display body;
   a first friction member having a portion which is disposed between a side of a first base member of the base and the bracket; and
   a second friction member having a portion disposed between a portion of the second end of the connecting member and another side of the first base member.

2. The display stand according to claim 1, wherein the bracket is fixedly connected to the second end of the connecting member.

3. The display stand according to claim 1, wherein the base comprises a first base member and a second base member coupled to one side of the first base member, and the second base member covers the swivel supporter and the second end of the connecting member.

4. The display stand according to claim 3, wherein the base receives the connecting member through a hole formed in the second base member.

5. The display stand according to claim 1, wherein the first friction member has a bent portion for cooperating with the bracket.

6. The display stand according to claim 1, wherein the first friction member is made of acetal resin.

7. The display stand according to claim 1, wherein the second end of the connecting member has a step part for cooperating with the second friction member.

8. The display stand according to claim 1, wherein the second friction member is made of acetal resin.

9. The display stand according to claim 3, wherein the second base member is made of oval shape.

10. The display stand according to claim 3, wherein the second base member has the protrusion for covering a portion of the connecting member.

11. The display stand according to claim 1, wherein a bottom portion of a first base member of the base has a second protruding portion.

12. The display stand according to claim 11, wherein the bracket has a first groove for receiving the second protruding portion.

13. The display stand according to claim 12, wherein the first friction member has a second groove for passing therethrough the second protruding portion of the first base member.

14. The display stand according to claim 13, wherein the length of the first groove is greater than the length of the second groove.

15. The display stand according to claim 14, wherein the first friction member rotates in unison with the bracket.

16. The display stand according to claim 15, wherein the first friction member is prevented from rotating in unison with the bracket when the second protruding portion engages either end of the second groove of the first friction member.

17. The display stand according to claim 1, wherein a first base member of the base generally has a protruding shape.

18. The display stand according to claim 1, wherein the connecting member is made substantially of cylindrical shape.

19. The display stand according to claim 1, wherein the first friction member and the second friction member is made of acetal resin.

20. The display stand according to claim 1, wherein the first end of the connecting member is connected to a television display.

21. The display stand according to claim 20, wherein the television display is an LCD display.

22. The display stand according to claim 20, wherein the television display is a PDP display.

23. A display apparatus comprising:
a display body;
a connecting member having a first end for connection to the display body;
a base with a protrusion on one side of the base, the protrusion having a hole capable of accepting a second end of the connecting member, the base having a swivel supporter to support the second end of the connecting member;
a bracket disposed on the other side of the base and being connected to the second end of the connecting member through the hole, such that the connecting member can swivel about a vertical axis of the connecting member with respect to the base and both the second end of the connecting member and the protrusion collectively function as a neck between the base and the display body thereby supporting the display body;
a first friction member having a portion which is disposed between a side of a first base member of the base and the bracket; and
a second friction member having a portion disposed between a portion of the second end of the connecting member and another side of the first base member.

24. The display stand according to claim 2, wherein the bracket includes a plurality of holes for receiving screws which will fixedly attach the bracket to the second end of the connecting member.

25. A display stand comprising:
a connection member having a first end to connect to a display body;
a base with a protrusion portion on one side of the base, the protrusion portion coupling a second end of the connecting member; and
a bracket disposed on the other side of the base and being connected to the second end of the connecting member through the protrusion portion, such that the connecting member can swivel about a vertical axis of the connecting member with respect to the base and both the second end of the connecting member and the protrusion portion collectively function as a neck between the base and the display body thereby supporting the display body,
wherein a bottom portion of the base has a second protruding portion, and
wherein the bracket has a first groove to receive the second protruding portion.

* * * * *